United States Patent [19]

Yoo

[11] Patent Number: 5,757,802
[45] Date of Patent: May 26, 1998

[54] AUDIO/VIDEO BIT STREAM INTERLEAVING METHOD FOR VARIABLE BIT RATE ENCODER

[75] Inventor: Jea Yong Yoo, Seoul, Rep. of Korea

[73] Assignee: LG Electronics Inc., Seoul, Rep. of Korea

[21] Appl. No.: 577,857

[22] Filed: Dec. 22, 1995

[30] Foreign Application Priority Data

Dec. 24, 1994 [KR] Rep. of Korea .................. 1994-36518

[51] Int. Cl.$^6$ ..................................................... H04N 7/50
[52] U.S. Cl. ........................ 370/474; 370/509; 370/538; 348/423
[58] Field of Search ...................................... 348/387, 423, 348/515, 461, 462, 464–466, 845, 845.2; 370/464, 468, 473, 474, 475, 476, 503, 504, 506, 509, 537, 538, 486, 487, 522, 528; 395/200.53, 200.56

[56] References Cited

U.S. PATENT DOCUMENTS

| | | | |
|---|---|---|---|
| 5,214,741 | 5/1993 | Akamine et al. | 704/274 |
| 5,287,182 | 2/1994 | Haskell et al. | 370/484 |
| 5,467,342 | 11/1995 | Logston et al. | 370/253 |
| 5,521,927 | 5/1996 | Kim et al. | 370/474 |
| 5,533,021 | 7/1996 | Branstad et al. | 370/517 |
| 5,598,352 | 1/1997 | Rosenau et al. | 348/423 |

OTHER PUBLICATIONS

A.J. Wasilewski The MPEG-2 Systems Specification: Bluprint For NetwotkInteroperability, Senior Staff Engineer, Scientific Atlanta, Jan. 3, 1904.

*Primary Examiner*—Benedict V. Safourek
*Assistant Examiner*—Seema S. Rao
*Attorney, Agent, or Firm*—John P. White; Cooper & Dunham LLP

[57] ABSTRACT

In the data encoding/decoding method according to the MPEG (Moving picture Expert Group) system, the audio/video bit stream interleaving method includes a first step of determining as to whether a PTS (Presentation Time Stamp) is present in audio/video packets so as to estimate the PTS from a preceding packet in the absence of the PTS, a second step of comparing the audio packet with the video paket in the PTS to output one of the packets which has smaller PTS value, and a third step of multiplexing the audio or video packet to form an audio/video bit stream, so that the decoder is prevented from the overflow or underflow pheonomena in consideration of the decoding time within the audio/video packet data decoding time.

5 Claims, 3 Drawing Sheets

AUDIO/VIDEO BIT STREAM INTERLEAVING METHOD FOR VARIABLE BIT RATE ENCODER

BACKGROUND OF THE INVENTION

The present invention relates to an encoding/decoding method of audio/video packet data by an MPEG(Moving Picture Expert Group) system, and more particularly, to an audio/video bit stream interleaving method for a variable bit rate encoder which can remove the overflow or underflow phenomena of a decoder by interleaving audio/video data taking into consideration of presentation time while decoding packet data.

Generally, in a system using the MPEG algorithm, the interleaving method is adapted for the decoder buffer to prevent the overflow or underflow from the audio/video data.

A conventional interleaving method of the audio/video packet data, as shown in FIG. 1, is performed in a constant bit rate encoder and includes an interleaving block for multiplexing audio packets having a low bit rate and video packets having a high bit rate.

In such an interleaving method, a reference interleaving element is a difference rate between an audio data rate and a video data rate. According to the difference rate, the interleaving is performed to precisely set the audio/video packet data rates to a predetermined period.

In FIG. 1, the data of which packs comprise a plurality of packets are formatted so as to arrange only one packet for a pack of the data.

Each audio/video packet precisely includes 2250 bytes and each audio/video pack includes 2324 bytes by adding pack headers of 74 bytes to the audio/video packets.

In more detail, the interleaving method of the above audio/video data, for example, of which audio data rate is 192 kbps and video data rate is 1,158 mbps is as follows:

wherein if the audio data rate 192 kbps is 2400 bytes/second, the number of audio packets/second is determined by the following formula, the number of audio packets/second =

$$\frac{\text{audio data rate}}{\text{audio packet rate}} = \frac{24000 \text{ bytes/s}}{2250 \text{ bytes}} = 10\frac{2}{3},$$

and wherein if the video data rate 1.158 mbps is 144750 bytes/s, the number of video packets/second is determined by the following formula, the number of video packets/second =

$$\frac{\text{video packet rate}}{\text{video packet size}} = \frac{144750 \text{ bytes/s}}{2250 \text{ bytes}} = 64\frac{1}{3}$$

Therfore, the number of audio/video packet number/second is $$10\frac{2}{3} + 64\frac{1}{3} = 75 \text{ packet/sec.}$$

where, a three-second-period of interleaving method is chosen to change the audio/video packet numbers integers.

That is, if all packet numbers of three-second-period is 75×3=225 packets, three-second-period audio packet number =

$$10\frac{2}{3} \times 3 = 32 \text{ packets, and}$$

three-second-period video packet number =

$$64\frac{1}{3} \times 3 = 193 \text{ packets.}$$

Therefore, the packet rate of the three-second-period audio packet number and the three-second-period video packet number becomes $$\frac{\text{video packet number}}{\text{audio packet number}} = \frac{193}{32} = 6.03125.$$

The above packet rate 6.03125 is achieved by interleaving one audio packet after sixth and seventh video packet.

Therefore, all packets of 225 are to be formatted as follows:

$$(6 + 1) \times 31 + (7 + 1) = 225$$
$$\uparrow \downarrow \quad\quad \uparrow \downarrow$$
$$V\ A \quad\quad V\ A$$

To descrbe the above formula in more detail, during every three seconds one audio packet is inserted after six video packets and after repeating this pattern 31 times, one more audio packet is inserted again after seven video packets.

The coventional interleaving method using the video/audio data rates as above is, however, not suitable for the variable bit rate system due to the disadvantages that the audio/video data rates are not changed linearly but only the video data rate is varied while the audio data rate is fixed.

SUMMARY OF THE INVENTION

Therefore, in order to overcome such problems of the prior art interleaving method, there is provided an audio/video bit stream interleaving method for a variable bit rate encoder in which the interleaving is performed with reference to a PTS (Presentation Time Stamp) exsiting in a packet header.

To accomplish the object of the present invention, there is provided one embodiment of an audio/video bit stream interleaving method for a variable bit rate encoder comprising the steps of detecting the presence of a PTS in audio/video packets for estimating from a preceding PTS a current one in the absence of the PTS, comparing PTSs of the audio/video packets to output an alternative packet having smaller PTS, and multiplexing the audio or video packets to form an audio/video bit stream.

DETAILED DESCRIPTION OF THE INVENTION

Hereinafter, a preferred embodiment of an audio/video bit stream interleaving method of a variable bit rate encoder will be described with reference to the attached drawings.

Figure 1:
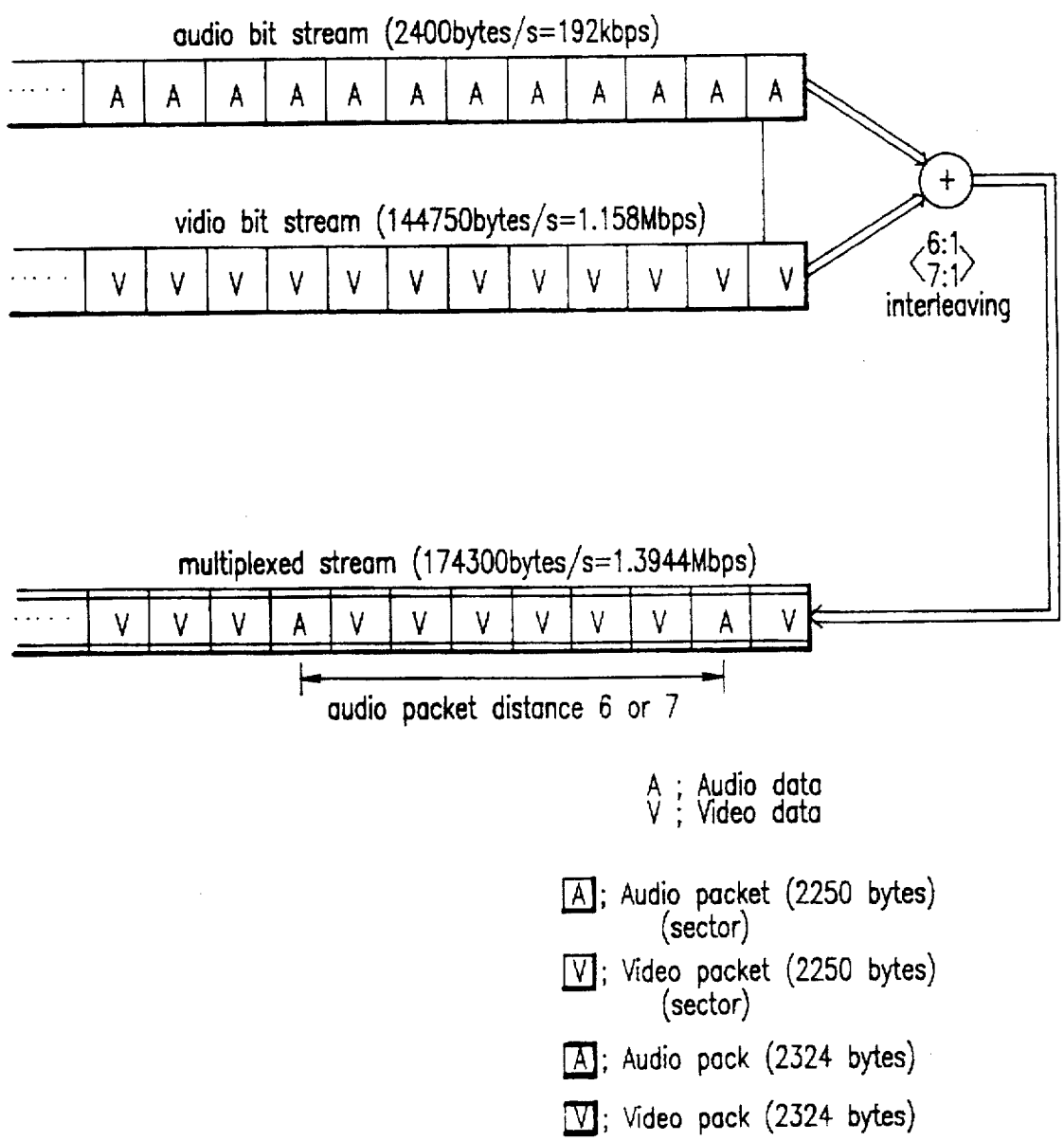
FIG. 1 is a block diagram for explaining a conventional interleaving method for the audio/video packet data of a variable bit rate encoder.
Figure 2:
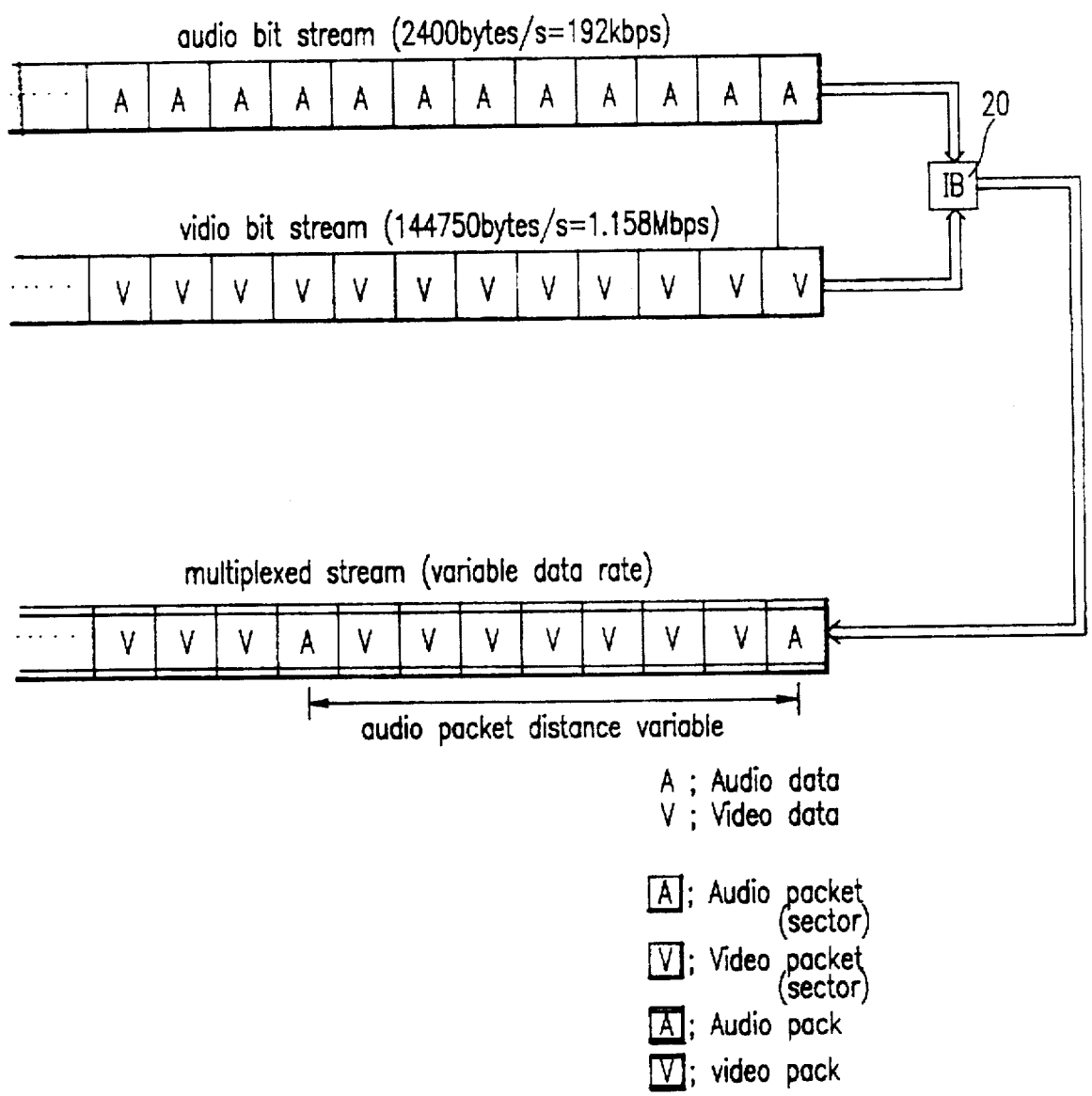
FIG. 2 is a block diagram for explaining an interleaving method for the audio/video packet data of a variable bit rate encoder according to a preferred embodiment of the present invention.
Figure 3:
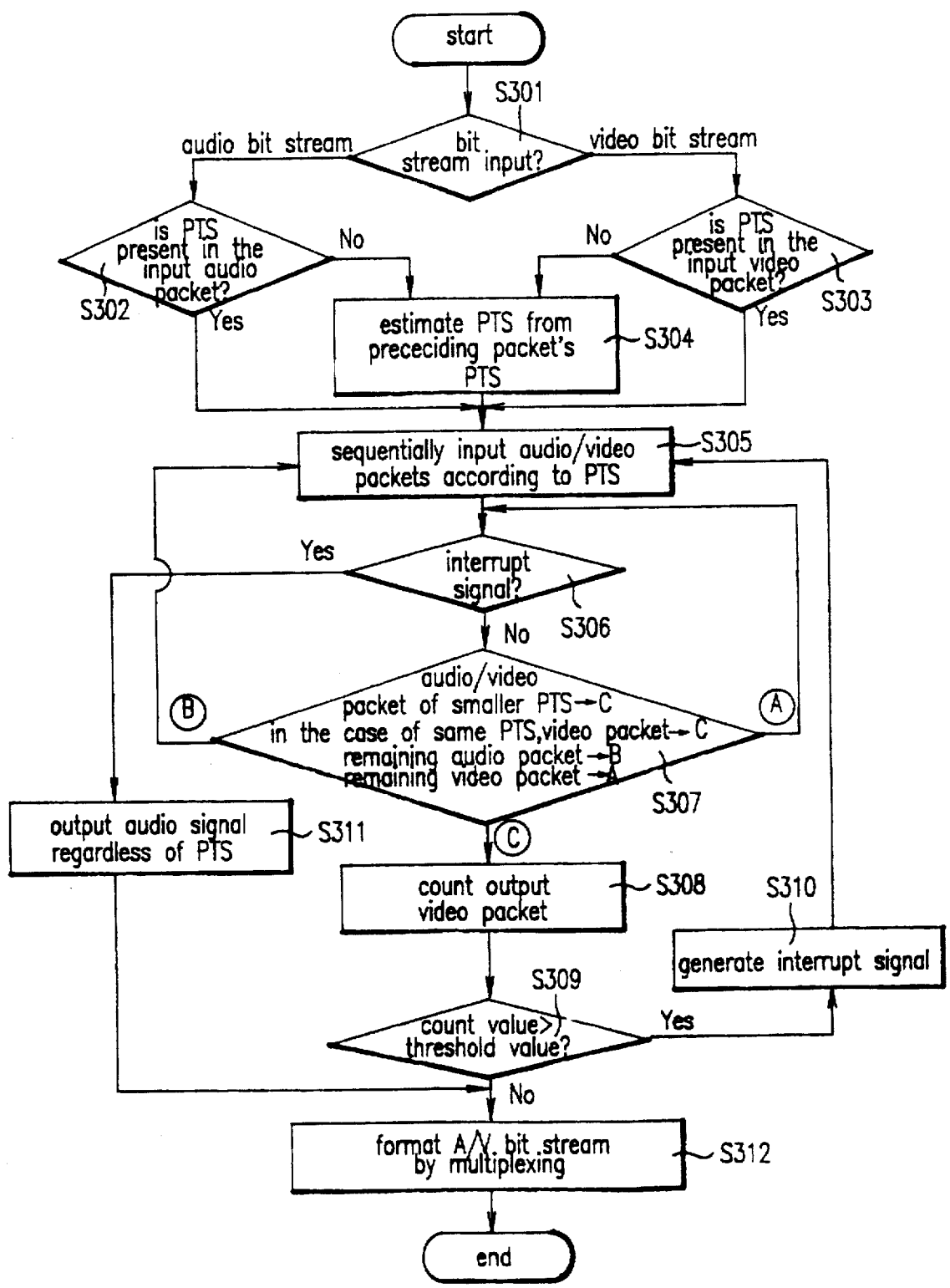
FIG. 3 is a flow chart of the interleaving method for the audio/video bit stream of the variable bit rate encoder according to the preferred embodiment of the present invention.

FIG. 2 is a block diagram for explaining the interleaving method for the audio/video packet data of a variable bit rate encoder according to the present invention, and FIG. 3 is a flow chart of the interleaving method for the audio/video bit stream of the variable bit rate encoder according to the preferred embodiment of the present invention.

Referring to FIG. 2, an audio bit stream is input to an interleaving block (20) at a fixed data rate. On the other hand a video bit stream has a variable data rate so that maximum bit rate and minimum bit rates are set while encoding, where its total average bit rate is used to set a threshold value in the interleaving block (20). According to the threshold value, the maximum audio packet distance of a multiplexed bit stream is determined.

Referring to FIG. 3, the audio/video bit stream interleaving method of the variable bit rate encoder according to the present invention as above is described in more detail.

The audio bit stream and video bit stream are input to he interleaving block, packet by packet (S301). The input audio packet and video packet are determined if a PTS is present on the header information area of its packet, respectively (S302, S303). The PTS is one of the most important factors, where the PTS of an audio packet represents a time for outputting from a speaker after decoding and the PTS of the video packet represents a time to be displayed on a screen after decoding, being respectively shown to a SCR (System Clock Reference). And then, if the PTS is proved to be absent from the determination steps (S302, S303), the PTS is estimated from a preceding PTS for the audio packet or video packet (S304).

The estimation of the PTS is carried out as below.

Generally, in an MPEG encoder system, a PTS of a packet is calculated from the below equation, $$PTS = NINT(system\ clock\ frequency * tpn(k))\%2^{33} \qquad (1)$$

where, tpn (k) is the presentation time of the Kth presentation.

$$est.PTS = preceding\ PTS + NINT(system\ clock\ frequently * tpn(K))\%2^{33} \qquad (2)$$

where the size is bit size of the following data after the preceding PTS, system clock frequency is calculated by average data rate. The est.PTS is not accurate but there is no influence on a decoder buffer. The reason is that the error of estimated PTS is very small since the PTS is present usually in an interval less than 0.7 sec. By the MPEG format.

Next, audio packets including the PTSs and video packets including the PTSs are input (S105).

Then, the PTS of input audio packet and the PTS of input video packet are sequentially compared so as to output a packet which have a smaller PTS (S307). When the PTS of the audio packet is smaller than the PTS of the video packet, the audio packet is multiplex for making an A/V bit stream. The video packet having a larger PTS is compared to the following audio packet. When the PTS of the video packet is smaller that the PTS of the audio packet, the video packet is output for making an A/V bit stream. The audio packet having a larger PTS is compared to the following video packet. When the PTSs of the video packet and audio packet are the same, the video packet is output, while the audio packet having a same a PTS is compared to the following video packet.

In order to prevent a buffer which storing the A/V bit stream from overflowing, the number of the video packet outputting after comparing step S307 is counted. (S308) Number of the video packets outputting continuously should be limited since the buffer may overflow by storing an audio/video bit stream which has too many video packets relatively in case of which video data bit rate is maximum rate locally. The limited number of the video packets (threshold values) is determined by considering an average bit rate and a maximum bit rate. After comparing the counted value with a threshold value (S309), if the counted value is larger than the threshold value, an interrupt signal is generated (S310). In this case of interrupt signal (S306), audio packet is output regardless of the result of the comparison step (S307) (S311).

Audio packets and video packet, which are outputted after comparing its PTS, are multiplexed into A/V bit stream (S312).

As described above, the audio/video bit stream interleaving method for the variable bit rate encoder according to the present invention, comprises the steps of determining the presence of the PTS in the input audio/video packets to estimate a current PTS from a preceding PTS in the absence of the PTS, comparing the audio packet with the video packet in the PTS to output one of the packets having smaller PTS value, and multiplexing the audio or video packets to form the audio/video bit stream, so that the audio/video packets to be input in a predetermined period rather than to be input in one period are subject to the interleaving entirely by the audio/video pack.

Therefore, according to the interleaving method of the present invention as above, the interleaving is effectively achieved by preventing the decoder from the overflow or underflow by using the PTS of the packet header regardless of the size of the audio/video packets.

What is claimed is:

1. An audio/video bit stream interleaving method comprising:
  a first step of determining as to whether a PTS (Presentation Time Stamp) is present in audio/video packets so as to estimate the PTS from a preceding packet in the absence of the PTS,
  a second step of comparing the audio packet with the video packet in the PTS to output one of the packets which has smaller PTS value, and
  a third step of multiplexing the audio or video packet to from an audio/video bit stream.

2. An audio/video bit stream interleaving method according to claim 1, wherein the PTS is formatted in a packet head information area.

3. An audio/video bit stream interleaving method according to claim 1, wherein the video packet output from the second step is counted so that if the counted value exceeds a threshold value, an audio packet is output regardless of the PTS value.

4. An audio/video bit stream interleaving method according to claim 1, wherein if the audio packet and the video packet have the same PTS values, then the video packet is output.

5. An audio/video bit stream interleaving method according to claim 3, wherein the threshold value is determined by an average bit rate of the total audio bit stream.

* * * * *